United States Patent
Hartley

(10) Patent No.: US 7,063,099 B2
(45) Date of Patent: Jun. 20, 2006

(54) EXHAUST GAS CONTROL VALVE, APPARATUS AND METHOD OF CONTROLLING EXHAUST GAS FLOW

(75) Inventor: John P. Hartley, Blaine, WA (US)

(73) Assignee: Jenara Enterprises Ltd., Vancouver (CA)

( * ) Notice: Subject to any disclaimer, the term of this patent is extended or adjusted under 35 U.S.C. 154(b) by 0 days.

(21) Appl. No.: 11/107,847

(22) Filed: Apr. 18, 2005

(65) Prior Publication Data

US 2005/0183782 A1    Aug. 25, 2005

Related U.S. Application Data

(62) Division of application No. 10/413,573, filed on Apr. 15, 2003, now Pat. No. 6,880,572.

(60) Provisional application No. 60/372,137, filed on Apr. 15, 2002.

(51) Int. Cl.
*F16K 1/20* (2006.01)

(52) U.S. Cl. ............... 137/15.18; 137/315.16; 251/298

(58) Field of Classification Search ............ 137/15.18, 137/15.25, 315.16, 315.22, 315.24; 251/298
See application file for complete search history.

(56) References Cited

U.S. PATENT DOCUMENTS

| | | | |
|---|---|---|---|
| 1,734,631 A * | 11/1929 | McIlhenny | 251/298 |
| 2,852,037 A * | 9/1958 | Downing et al. | 251/297 |
| 3,834,663 A | 9/1974 | Donnelly | |
| 4,130,094 A | 12/1978 | Gropp | |
| 4,394,003 A | 7/1983 | Whitaker | |
| 4,463,564 A | 8/1984 | McInerney | |
| 4,601,459 A | 7/1986 | Verdelet | |
| 4,796,857 A | 1/1989 | Hayes et al. | |
| 4,817,916 A | 4/1989 | Rawstron | |
| 5,046,317 A | 9/1991 | Satokawa | |
| 5,069,240 A | 12/1991 | Kurkjian, Jr. | |
| 5,118,078 A | 6/1992 | Younker | |
| 5,249,773 A | 10/1993 | Feld | |
| 5,482,252 A | 1/1996 | Kamezawa | |
| 5,494,255 A | 2/1996 | Pearson | |
| 5,531,205 A | 7/1996 | Cook et al. | |
| 5,535,986 A | 7/1996 | Hutchens et al. | |
| 5,666,988 A * | 9/1997 | Becker | 137/15.18 |
| 5,685,520 A | 11/1997 | Velan | |
| 5,692,725 A | 12/1997 | Fehringer | |
| 5,722,634 A | 3/1998 | Hrytzak et al. | |
| 5,741,006 A | 4/1998 | Murai et al. | |
| 5,979,870 A | 11/1999 | Junier | |
| 6,029,949 A | 2/2000 | Brown et al. | |
| 6,039,034 A | 3/2000 | Field et al. | |
| 6,045,121 A | 4/2000 | Barker et al. | |
| 6,135,418 A | 10/2000 | Hatton | |
| 6,189,519 B1 | 2/2001 | Press et al. | |

(Continued)

*Primary Examiner*—Stephen M. Hepperle
(74) *Attorney, Agent, or Firm*—Berenato, White & Stavish, LLC

(57) ABSTRACT

The present invention is directed to an exhaust gas control (EGC) valve. The EGC valve comprises a valve housing having at least one inlet port, at least one outlet port, and a flow channel having a centerline extending between the ports. A valve seat is adjacent an opening in the at least one outlet port. The EGC valve further comprises a rotatable actuator shaft offset from the centerline. At least one L-shaped valve armature is operably connected to the actuator shaft. The valve armature has a first leg and a second leg. The first leg is connected to the actuator shaft so that rotation of the actuator shaft in a first direction positions the second leg into sealing engagement with the valve seat to close the flow channel.

4 Claims, 7 Drawing Sheets

U.S. PATENT DOCUMENTS

| | | |
|---|---|---|
| 6,216,677 B1 | 4/2001 | McConnell et al. |
| 6,224,064 B1 | 5/2001 | St. Germain |
| 6,244,567 B1 | 6/2001 | Robbins |
| 6,247,461 B1 | 6/2001 | Smith et al. |
| 6,295,975 B1 | 10/2001 | Yew et al. |
| 6,390,078 B1 | 5/2002 | Gee et al. |

* cited by examiner

EXHAUST GAS CONTROL VALVE, APPARATUS AND METHOD OF CONTROLLING EXHAUST GAS FLOW

CROSS-REFERENCE TO RELATED APPLICATION AND CLAIM TO PRIORITY

This is a nonprovisional application of provisional application, Ser. No. 60/372,137, filed Apr. 15, 2002, by John P. Hartley, entitled Exhaust Gas Control Valve, the disclosure of which is incorporated herein by reference, and priority of which is claimed pursuant to 35 U.S.C. §120.

This application is a divisional application of U.S. patent application Ser. No. 10/413,573, entitled EXHAUST GAS CONTROL VALVE, APPARATUS AND METHOD OF CONTROLLING EXHAUST GAS FLOW, filed on Apr. 15, 2003, and issued as U.S. Pat. No. 6,880,572 on Apr. 19, 2005, and the contents thereof are incorporated herein by reference.

FIELD OF THE INVENTION

The present invention is directed to an exhaust gas control (EGC) valve. The EGC valve comprises a valve housing having at least one inlet port, at least one outlet port, and a flow channel having a centerline extending between the ports. A valve seat is adjacent an opening in the at least one outlet port. The EGC valve further comprises a rotatable actuator shaft offset from the centerline. At least one L-shaped valve armature is operably connected to the actuator shaft. The valve armature has a first leg and a second leg. The first leg is connected to the actuator shaft so that rotation of the actuator shaft in a first direction positions the second leg into sealing engagement with the valve seat to close the flow channel. Rotation of the actuator shaft in the opposite direction pivots the second leg away from the valve seat, substantially completely opening the flow channel to permit unimpeded gas flow. The present invention is also directed to a method of adjusting the valve armature on the valve seat, and a method of controlling exhaust flow through the flow channel using the disclosed EGC valve.

BACKGROUND OF THE INVENTION

Control of exhaust gas flow in an internal combustion engine is commonly used to alter the engine's function or modify its performance. Exhaust gas generated by pistons of an engine is released into its exhaust system during an exhaust cycle. This gas flow may be controlled with the use of variously configured valves positioned and operated in the exhaust system of the engine.

Conventional EGC valves include sliding valves, poppet valves, and valve-in-bore systems. Sliding valves typically have a valve plate that slides into and out of the exhaust gas flow path, thereby controlling the flow. This type of valve may provide adequate flow, because the valve plate mechanism is generally not in the flow path when the valve is in an open position. Therefore, the flow path area is maximized. However, sliding valves have several disadvantages. One, the valve plate slides along a sealing surface during its articulation, which potentially causes excessive wear. Two, friction between the valve plate and the sealing surface may be very large at high-pressure differentials. The actuation system must exert a relatively large amount of energy to provide enough force to overcome such friction. Three, the overall system is often bulky because the actuation system pulls the valve plate straight out from its closed position thereby increasing the overall envelope that the valve takes up.

Poppet valves, such as engine exhaust valves or wastegate valves, have a face-sealing portion of the valve plate, which is moved away from a sealing surface to open the exhaust flow path. Such valves may provide a failsafe mode in the event of actuation system failure. However, in the presence of a high-pressure differential across the valve plate, a relatively high actuation system force is generally required to open the valve or keep the valve closed (depending on the exhaust flow direction when the valve is open). Furthermore, poppet valves often result in excessive flow restriction in the open position given a portion of the valve mechanism is positioned in the flow path when in the open position.

Valve-in-bore systems include wall contact type valves and 90-degree closing type valves. The wall contact type typically has an elliptical valve plate that is placed on a shaft in the bore. The valve plate is then rotated about the shaft axis, so that it eventually begins restricting the flow. In its closed position, the valve plate contacts the wall of the bore. A relatively small clearance between the valve plate and the bore provides a relatively low exhaust flow leakage. However, the contact of the valve plate on the bore requires a very sturdy actuation system. In addition, the valve plate is often prone to sticking in the bore, particularly with temperature fluctuations.

The 90-degree closing type has a valve plate that is round and slightly smaller in diameter than the bore. The valve plate rotates about a centerline of the bore. In its closed position, the valve plate is perpendicular to the exhaust flow and has relatively small annular space as clearance. This configuration reduces the occurrence of valve plate sticking in the bore compared to the wall contact type, but allows additional leakage of the exhaust flow.

EGC valves perform various functions in engine operation, such as lowering exhaust gas emissions, engine warm-up, engine retarding and exhaust gas recirculation (EGR). Engine retarding using exhaust brakes is well known in the art. Exhaust brakes generally include a restrictor valve mounted in the exhaust system. Such valves restrict the exhaust gas flow from exiting the engine, thereby retarding the engine. Exhaust system pressure is raised and the engine is required to expend substantial energy to continue to cycle. EGR valves reduce the formation of nitrogen oxides (NOx) during combustion by redirecting a portion of the exhaust gas to the intake system of the engine. That portion of the exhaust gas is then mixed with incoming fresh air, resulting in a lower combustion temperature. This limits production of NOx. EGC valves may also divert the exhaust gas to other after-treatment processes for further extraction of pollutants prior to releasing the gas into the atmosphere.

Various considerations influence the design of a particular EGC valve depending on the desired function or performance, such as accurate flow control resolution, sufficient flow capacity, ability to operate reliably in the exhaust system environment, leak proof sealing when the valve is closed, and resistance to sticking when opening the valve. It is desirable that EGC valves accurately meter the exhaust gas flow over a wide range of operating conditions. Generally, more accurate control is required at low flow rates than at high flow rates.

Conventional EGC valves typically rely on actuator positioning to control the amount of flow, and exhibit a proportional, or linear response over their entire range of valve-opening positions. Some conventional systems use pneumatic pressure to actuate a pintle valve, and a pressure-balanced diaphragm with an air bleed to maintain valve position. Alternatively, the pintle valve may be solenoid actuated, and have two gaps wherein a first gap is engaged for low flow and a second gap is engaged for high flow. In either case, the response of such valves remains linear and there is no fine control for accurately metering the exhaust gas flow volume.

Some conventional systems include an electronic component for adjusting a poppet valve for controlling gas flow. The electronic component may trigger valve actuation based on sensed engine temperature. Such valves provide some improvement over pneumatic pressure actuated valves, but still lack fine control for accurately metering the exhaust gas flow because the flow is limited to the linear flow characteristic of the poppet valve.

In addition to accurate flow metering problems, the configurations of many pintle valves and poppet valves are inherently restrictive to exhaust flow. As such, flow control resolution (i.e. the rate at which the effective flow area changes) is adversely affected. The shafts of pintle and poppet valves are typically positioned in the central portion of the exhaust flow duct, thereby partially blocking the flow area in the flow duct. As such, the maximum flow area is reduced. Furthermore, a relatively large actuator stroke is required for actuating many types of conventional linear valves.

Various attempts have been made to overcome flow rate problems associated with conventional EGC valve systems. One such attempt provides for a system having a butterfly valve that allows for a relatively high exhaust flow rate with minimal flow restriction. Another attempt provides a system having an eccentric drive to achieve a relatively high lift with a poppet valve, which improves flow capacity. Another system includes a valve with concentric flow orifices to provide for a relatively high flow capacity with a relatively low stroke compared to a conventional linear actuator and valve systems. Although flow rate capacity may be improved, such systems fail to provide for accurate flow control resolution.

In addition to flow rate problems, soot deposits and condensates may accumulate in the clearances between the moving parts of a conventional EGC valve due to the environment to which such valves are subject. Wide temperature fluctuations and residual products of combustion (i.e. soot and condensates) are present in the exhaust gas. These residual products may build-up and cause incomplete sealing when the valve is seated in its closed position. They may also cause conditions that require high breakaway energy to open the valve from its closed position.

Attempts to reduce soot and condensate build-up have been made for some EGC valves. One attempt provides for a pintle valve design that reduces the thermal inertia of the pintle valve head, which reduces the rate of carbon build-up. Another attempt provides for a EGC valve assembly that can be mounted on the exhaust manifold side of the engine. This avoids condensates that may form and deposit in a valve mounted on the cooler intake side. Such systems have achieved partial success in overcoming problems associated with condensates and soot deposits, but fail to also provide for accurate flow control and/or high flow rate capacity.

Another consideration in EGC valve design is the pressure or force required for actuation of the EGC valve, or "break-away force". The break-away force influences the size of the actuator hardware. This, in turn, can effect system packaging and manufacturing costs. In some conventional EGC valves, in order to open such valves from their closed position, a relatively large amount of energy from the actuator is required. For example, a butterfly valve with a radial seal may be subject to sticking in its closed position in the valve seat. As such, a relatively large amount of energy is required to overcome such sticking. Furthermore, the required energy and force required for opening the valve may be exacerbated by temperature fluctuations in the exhaust system. Soot and condensate build-up may also increase the required break-away force. Some conventional systems have attempted to address this problem, but have not provided a valve design that also provides for accurate flow control, high flow rate capacity and/or exhaust system environment compatibility.

Another consideration for EGC valve design concerns leakage when the valve is in the closed position. It is sometimes desirable for the EGC valve to have a leak proof seal when in a fully closed position. Several attempts have been made to achieve a leak proof seal using butterfly valves and radial seals. There are various designs for fitting a resiliently loaded seal ring into the valve flow channel such that when the valve is in the closed position, the outer periphery of the valve armature pushes against the seal ring. Alternatively, the resilient seal ring may be positioned directly on the outer periphery of the valve armature so that a radial seal is made when the valve closes against the flow channel wall.

One radial seal design provides a relatively leak proof seal, but is relatively expensive and complex. Increased complexity may compromise reliability. In an attempt to minimize complexity, another design includes a formed hard seat positioned in the flow channel. The hard seat mates with a contoured profile on the outer periphery of the valve armature. The valve seat may be machined directly in the valve housing. Alternatively, he valve seat may be machined on a seal ring, and then the seal ring mounted in the housing. Although complexity is slightly decreased, precision machining is required to achieve mating components that seal around the entire circumference of the valve. Manufacturing and assembly costs are again relatively high. Furthermore, most radial seal designs are prone to sticking in the valve seat when subjected to engine temperature fluctuations and debris build-up.

Other designs provide for rotating the armature into a partially seated position and then translating linearly or axially into the seat. A cam or pivot mechanism may be integrated into the valve actuator shaft that engages near its final rotation. This may overcome some sticking problems associated with radial sealing of butterfly valves. However, complexity and cost are again increased. Furthermore, such translating seal designs often fail to provide accurate flow rate control.

Other designs offset the actuator shaft centerline from the valve armature centerline to improve sealing in a butterfly valve. The offset is such that the moment force on the flow side for closing the valve is increased. On the flow side for opening the valve, less area on the armature is exposed. In this way, the force required for opening the valve is decreased. The net moment force is greater on the flow side for closing the valve, thereby enhancing sealing. However, such designs are often subject to sticking, or require expensive precision machining for orienting the sealing surfaces.

Other designs provide for valve designs with flexible face seal contact. Generally, face-sealing valves are not subject to sticking compared to radial seal designs, because a flat surface on the valve armature engages a flat surface on the valve seat. The valve armatures in such designs incorporate discs that are pivotally mounted on the actuator arm. This may allow for self-alignment of the disc on the valve seat when in the closed position. Although precision machining may not be required to align the sealing surfaces of such valves, they fail to provide for fine resolution of flow rate control.

While prior designs have addressed some of the issues and problems associated with EGC valve function and performance, they do not adequately address all of these issues in one EGC valve. Therefore, there is a need for an EGC valve that provides accurate flow control resolution, sufficient flow capacity, the ability to operate reliably in the harsh environment of an exhaust system, leak proof sealing and resistance to sticking. In addition, there is a need for an EGC valve having a failsafe operation that limits or shuts off flow in the event of an actuator failure. Simplicity in design and ease of manufacture is typically important for any EGC valve, given the cost sensitive needs of the automotive industry.

SUMMARY OF THE INVENTION

An exhaust gas control valve comprises a valve housing having at least one inlet port, at least one outlet port, and a flow channel having a centerline extending between the ports. The disclosed valve also includes a valve seat adjacent an opening in the at least one outlet port, and a rotatable actuator shaft offset from the centerline. At least one L-shaped valve armature is provided, having a first leg and a second leg. The first leg is operably connected to the actuator shaft so that rotation of the actuator shaft in a first direction positions the second leg into sealing engagement with the valve seat to close the flow channel.

An exhaust gas control valve comprises a valve housing having at least one inlet port, a plurality of outlet ports, and a flow channel having a centerline extending between the inlet and outlet ports. The control valve also includes at least one valve seat adjacent an opening of at least one outlet port, and a rotatable actuator shaft offset from the centerline. A plurality of L-shaped valve armatures are provided. Each armature has a first leg and a second leg. The first leg is operably connected to the actuator shaft so that rotation of the actuator shaft in a first direction positions the second leg into sealing engagement with the valve seat to close the flow channel.

A method of adjusting a valve armature on a valve seat is also disclosed, comprising the steps of: providing an L-shaped valve armature having a first leg and a second leg, the first leg having mounting holes and the second leg having a sealing surface; positioning the first leg on an actuator shaft so that the first leg is offset from a valve seat and the second leg is offset from an opening defined by the valve seat; partially tightening mounting screws through the mounting holes into the actuator shaft so that the first leg is transversely slidable relative to the actuator shaft; rotating the actuator shaft so that the second leg is parallel to the valve seat; transversely sliding the first leg relative to the actuator shaft until the sealing surface engages the valve seat; and tightening the screws so that the armature is secured to the actuator shaft.

A method of controlling exhaust flow through a flow channel comprises the steps of: providing a valve housing having an inlet port, an outlet port, a flow channel having a centerline extending between the pods, and a valve seat adjacent an opening in the outlet port; providing an actuator shaft offset from the centerline, the actuator shaft having an L-shaped armature extending therefrom, the armature having a first leg and a second leg; rotating the actuator shaft in a first direction for positioning the second leg substantially parallel to and offset from the centerline so that the flow channel is substantially unrestricted.

The disclosed EGC valve provides numerous benefits over prior art designs. Specifically, the disclosed EGC valve is relatively inexpensive and easy to manufacture. It provides relatively low restriction when the valve is in an open position, and minimal or no leakage when in a closed position. In addition, the disclosed valve has a failsafe operation, to limit or shut off flow in the event of actuator failure. The valve functions properly in a wide range of environmental conditions in the exhaust system of the engine, and is tolerant of soot and condensate build-up. The disclosed valve is not prone to sticking, and operates with low breakaway force from the closed to open positions. It can control the flow of any number of inlet and outlet ports in any number of different shapes and combinations from a single actuating shaft.

The disclosed EGC valve may be used for control of EGR in an internal combustion engine, for engine retarding as an engine exhaust brake, or for controlling flow in other emission control systems. It provides accurate flow control resolution for metering exhaust gas over a wide range of operating conditions. The disclosed valve may have variable flow characteristics, determinable by armature, duct and port design. Positive sealing is provided when the valve is closed, and the valve is not subject to sticking during breakaway opening.

DETAILED DESCRIPTION OF THE INVENTION

Figure 1:
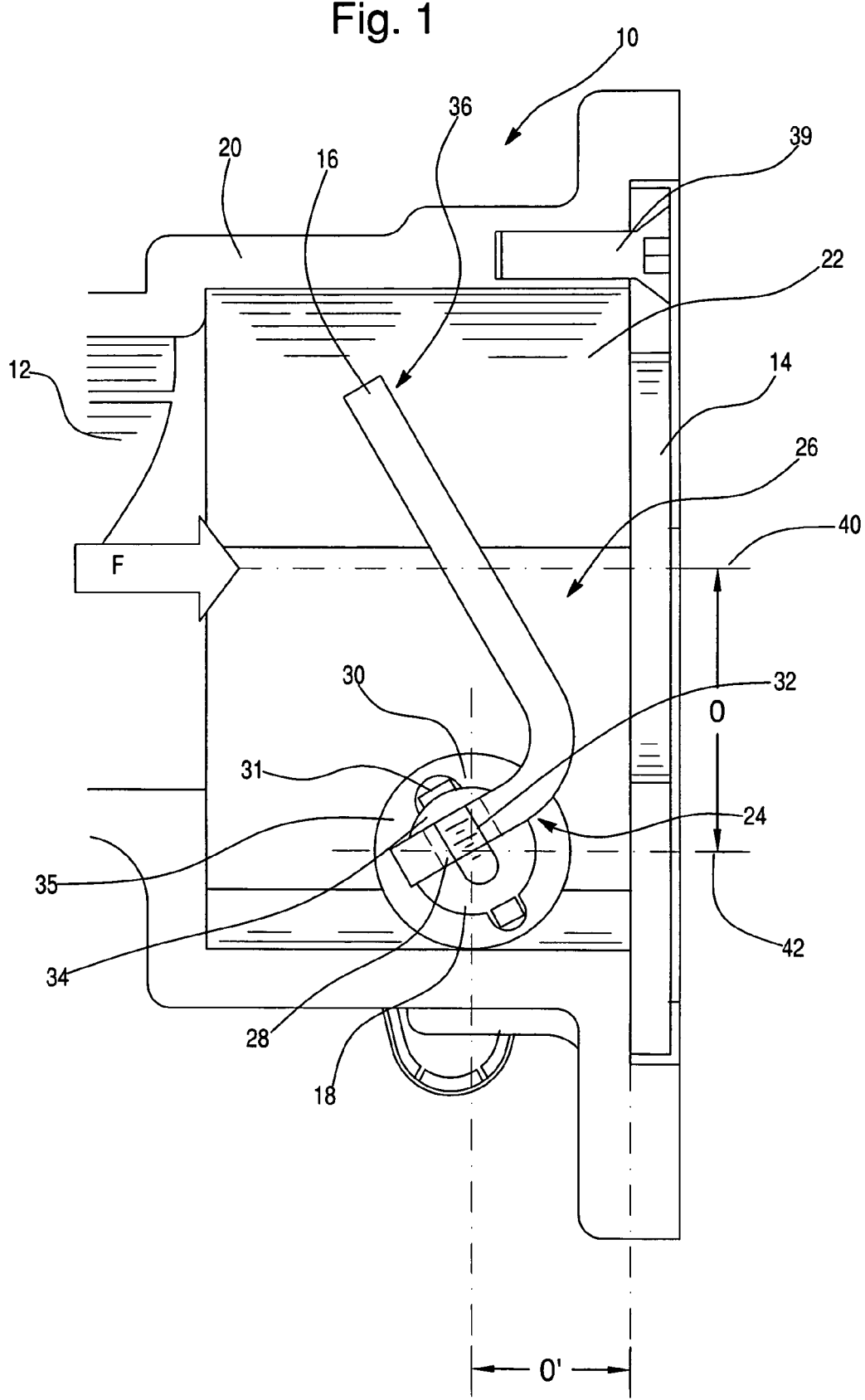
FIG. 1 is a cross-sectional view of an exhaust gas control valve according to the present invention with an armature in a partially open position.

As best shown in FIG. 1, an exhaust gas control (EGC) valve 10 is provided for control of exhaust gas flow from an inlet port 12 to an outlet port 14 in an internal combustion engine, such as a diesel engine. EGC valve 10 comprises a valve armature 16 attached to an actuator shaft 18. Actuator shaft 18 is operably associated with an actuator system, such as a pneumatic actuator/piston assembly, as known in the art. Armature 16 and shaft 18 are mounted in a valve housing 20. Exhaust gas flow, shown by arrow F, enters housing 20 through inlet port 12, passes through a flow channel 22, and exits through outlet port 14.

Armature 16 is an L-shaped plate, having a first leg 24 and a second leg 26. First leg 24 is substantially perpendicular to second leg 26. In addition, first leg 24 has a length that is less than the length of second leg 26. Preferably, armature 16 includes mounting holes 28 (shown as dashed lines in the cross-sectional view of FIG. 1) in first leg 24, and is fastened to shaft 18 with mounting screws 30, bolts, rivets, or like fasteners. Preferably, a retaining pin 31 positions and maintains a valve stem seal 35 in the valve housing. Mounting screws 30 include shanks 32 and heads 34, as known in the art. Mounting holes 28 are larger in diameter than the diameter of shanks 32 of mounting screws 30, and smaller in diameter than the diameter of heads 34. In this way, the position of armature 16 may be adjusted during assembly by sliding armature 16 transversely to a desired position before completely tightening mounting screws 30 into actuator shaft 18.

Figure 2:
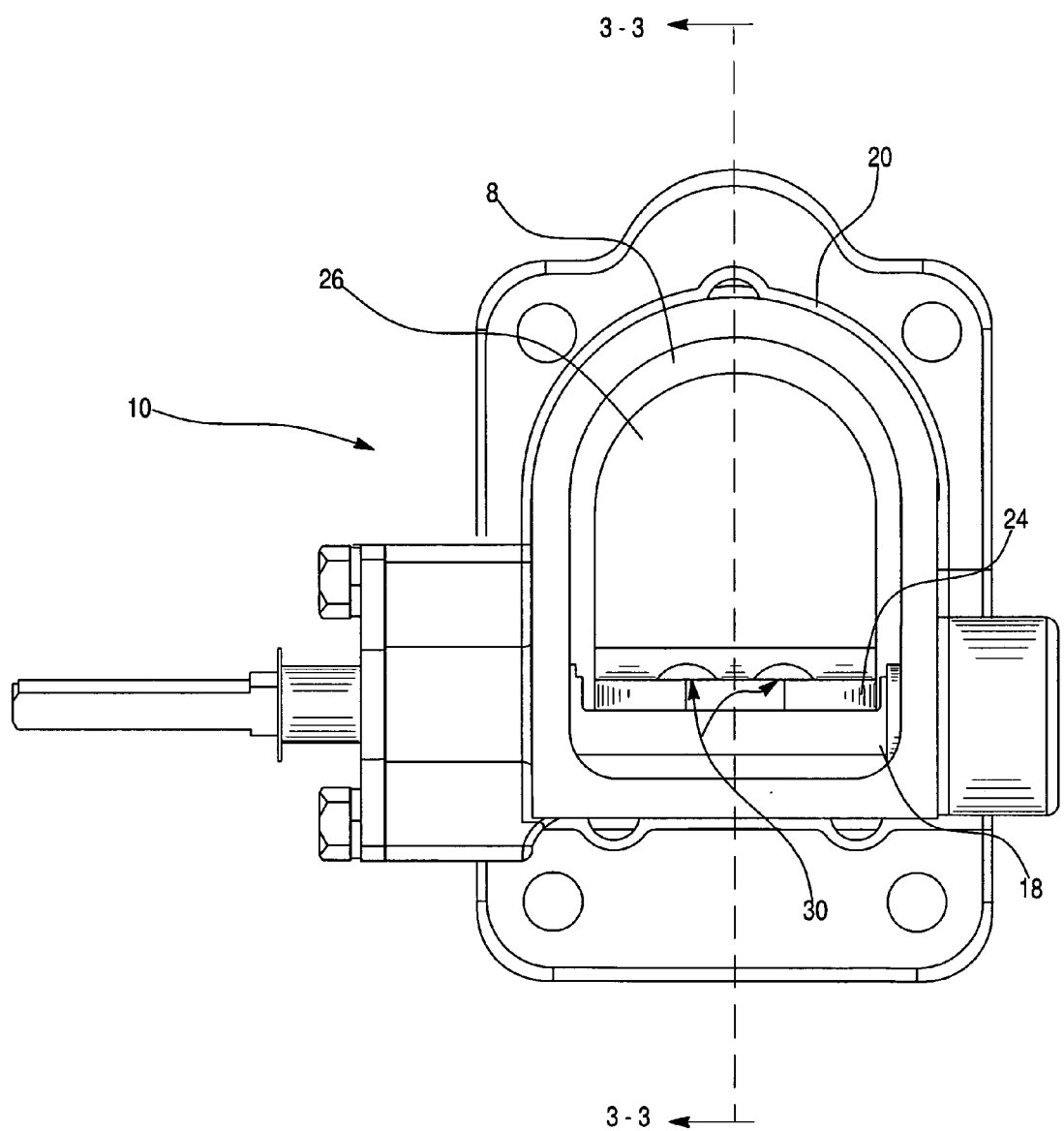
FIG. 2 is an elevational view of an exhaust gas control valve according to the present invention in a fully closed position.
Figure 3:
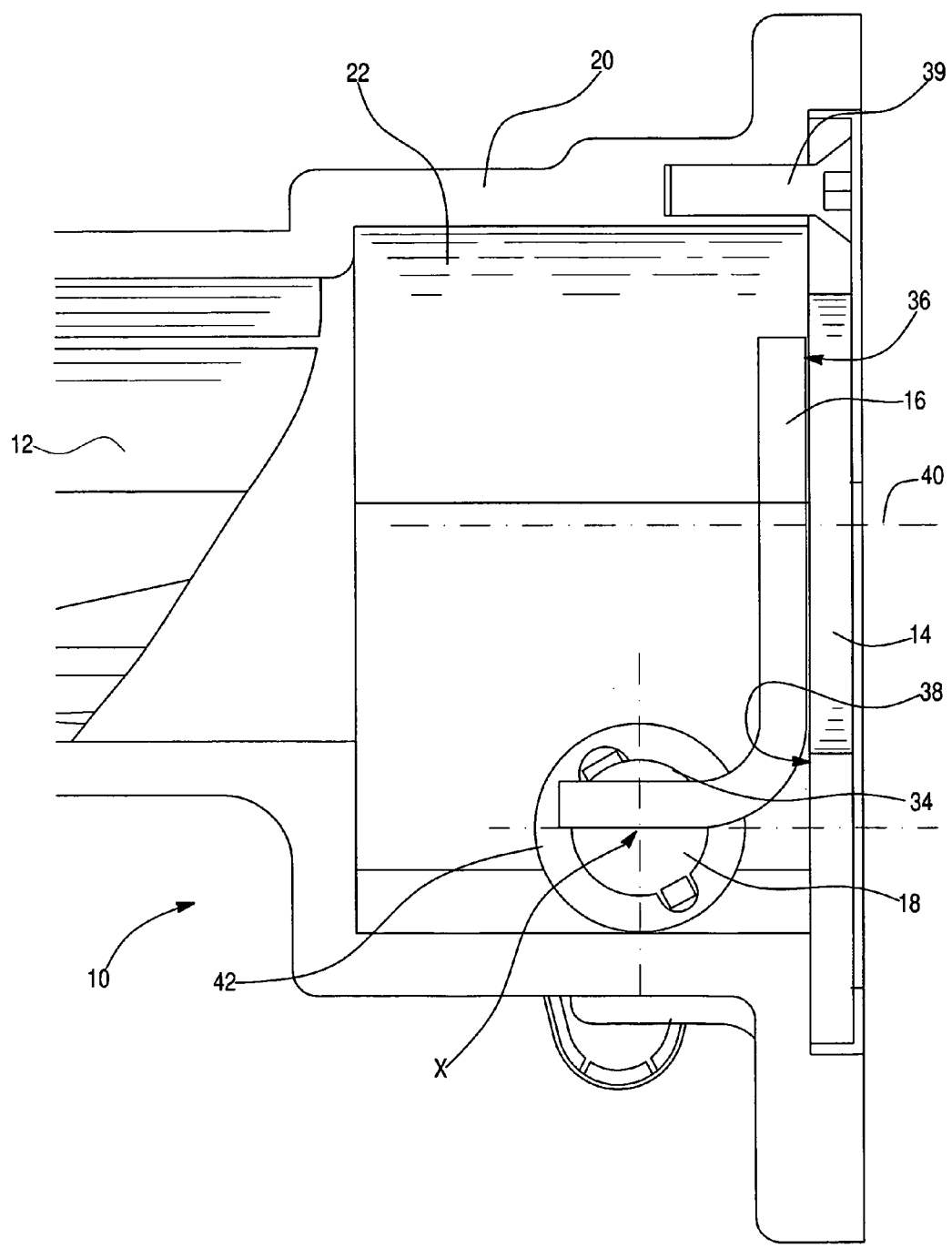
FIG. 3 is a cross-sectional view of the exhaust gas control valve of FIG. 2 taken along line 3—3 and viewed in the direction of the arrows.

Second leg 26 includes a seating surface 36, preferably flat or planar, for sealably engaging valve seat 38 on outlet port 14, as best shown in FIG. 3. Valve seat 38 may be secured to outlet port 14 with valve seat mounting screws 39. As best shown in FIGS. 2 and 3, actuator shaft 18 may be rotated, thereby causing sealing surface 36 on armature 16 to engage valve seat 38. EGC valve 10 is then in a fully closed position and restricts exhaust flow F from passing through flow channel 22 and out outlet port 14.

Figure 4:
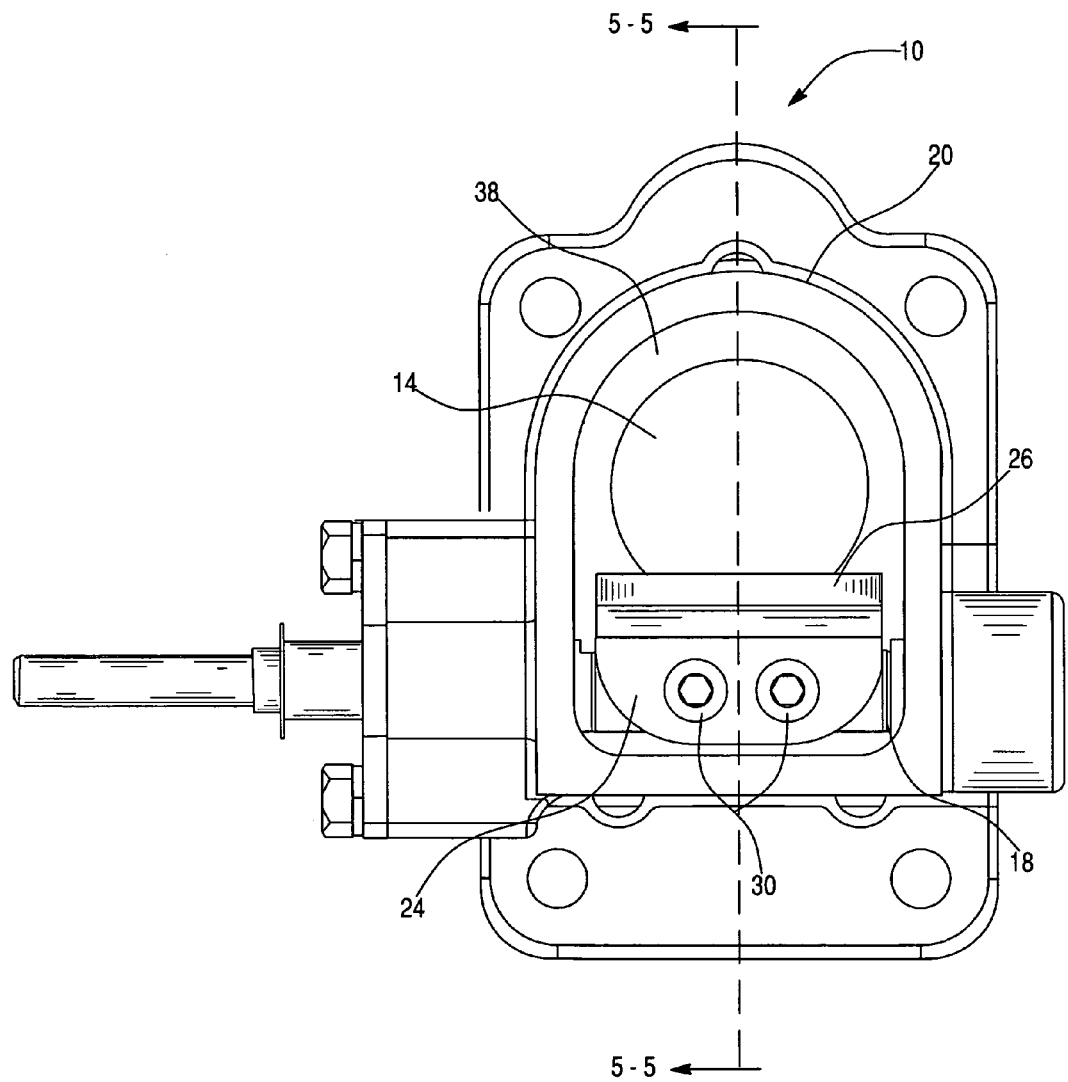
FIG. 4 is an elevational view of an exhaust gas control valve according to the present invention in a fully open position.
Figure 5:
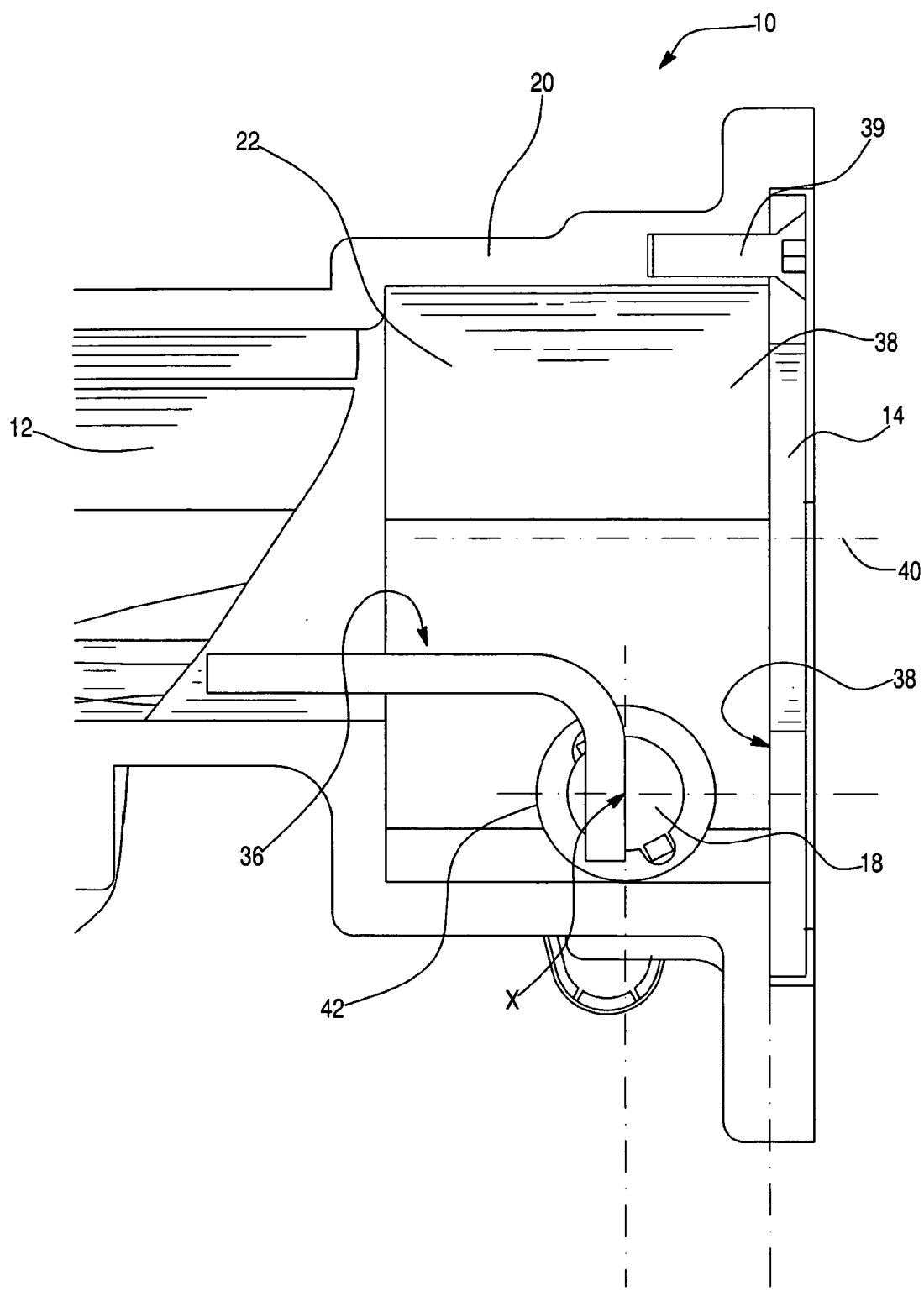
FIG. 5 is a cross-sectional view of the exhaust gas control valve of FIG. 4 taken along line 5—5 and viewed in the direction of the arrows.

As best shown in FIGS. 4 and 5, actuator shaft 18 may be rotated in a counter-clockwise direction for opening EGC valve 10. When so rotated, exhaust flow F passes through flow channel 22 and out outlet port 14, because second leg 28 unblocks outlet port 14, and outlet port 14 is then opened fully. Flow F is substantially unrestricted by armature 16 when EGC valve 10 is in the fully opened position.

Exhaust flow F passes through flow channel 22 along a center path in flow channel 22, or centerline 40 (shown as a dashed line in FIG. 1, 2 and 4). Centerline 40 may be centered in outlet port 14. However, outlet port 14 need not be centered with flow channel 22. The axis of actuator shaft 18 is offset from centerline 40 on a plane 42 that is parallel to centerline 40, shown as distance O in FIG. 1. In addition, actuator shaft 18 is offset from valve seat 38 of outlet port 14 by a distance O', as best shown in FIG. 1. Distance O may be greater than distance O', but distance O may also be equal to or less than distance O' depending on the particular application of EGC valve 10. Distances O and O' differ according to the mounting position of actuator shaft 18, the positioning of outlet port 14 in flow channel 22, and the length of first and second legs 24, 26.

The offset positioning of actuator shaft 18, in conjunction with the L-shaped configuration of armature 16, provides a substantially unrestricted flow of exhaust flow F, as best shown in FIGS. 4 and 5, when armature 16 is rotated into the open position shown in FIG. 4. When actuator shaft 18 is rotated to the fully open position, the effective flow path is substantially unrestricted by armature 16 because armature 16 is spaced from centerline 40 by distance O. Thus, flow channel 22 is almost completely unrestricted by armature 16, thereby maximizing flow area in flow channel 22. When actuator shaft 18 is rotated to sealably engage sealing surface 36 of armature 16 against valve seat 38, exhaust flow F is completely blocked. Furthermore, positive sealing is enhanced by the flow pressure and force created by flow F against armature 16 and on valve seat 38, providing a leak-proof seal.

Additionally, EGC valve 10 provides for failsafe operation in the event of actuator failure, because armature 16 is biased toward the fully closed position by the force and pressure of exhaust flow F acting on it. EGC valve 10 remains closed in the event of actuator system failure if, for example, EGC valve 10 is used as an EGR valve. As shown in FIG. 5, if EGC valve 10 is in the open position, armature 16 is biased toward the fully closed position because some exhaust flow F acts on first leg 24. Without the force from the actuator system, first leg 24 of armature 16 would pivot about point X. Exhaust flow F would then act against first and second legs 24, 26 to close armature 16. Thus, even if EGC valve 10 is in the open position, failsafe operation is provided if the actuator system fails.

It should be understood, however, that if EGV valve 10 is mounted so that gas flow F is in the opposite direction of that shown in FIG. 1, armature 16 would be biased toward a fully open position because exhaust flow F acts on second leg 26 to keep armature 16 open. As known in the art, such a mounting for EGC valve 10 may be appropriate if EGC valve 10 is used as an exhaust brake, wherein EGC valve 10 would remain open in the event of actuator system failure.

Flow control resolution of EGC valve 10 may be fine tuned for a particular application by altering the precise shapes of valve armature 16, flow channel 22 and flow ports 12, 14. Alteration of one or more of these components changes the effective flow area profile. Flow control resolution is the rate at which the effective flow area changes as valve armature 16 moves relative to valve seat 38. The rate may be controlled and predetermined. The flow area profile may be modified to provide for a relatively slow opening, to proportional opening, to relatively fast opening as valve armature 16 articulates. The shape of the flow area profile may be altered experimentally, but preferably is shaped using computational fluid dynamics calculations during the design process, as known in the art.

A relatively small break-away force is required for actuation of EGC valve 10 because EGC valve 10 is a face-sealing valve. As known in the art, face-sealing designs are not prone to sticking in the closed position because soot build-up does not accumulate on surfaces that effect actuation. Therefore, armature 16 is not prone to sticking, even in the event of soot and condensate build-up from exhaust flow F.

EGC valve 10 may be adjusted to have a substantially leak-proof seal between sealing surface 36 and valve seat 38. As noted above, actuator shaft 18 is mounted offset from outlet port 14. As such, there is an offset gap between armature 16 and valve seat 26 when armature 16 is in the fully opened position. During assembly, armature 16 is mounted onto actuator shaft 18, and screws 30 are passed through mounting holes 28 and partially tightened but left relatively loose. Actuator shaft 18 is then rotated to bring armature 16 into the fully closed position, wherein sealing surface 36 is parallel to valve seat 38 on outlet port 14. First leg 24 of armature 16 may then be slid transversely on actuator shaft 18 until sealing surface 36 engages valve seat 38. The difference between the diameters of mounting holes 28 versus screw shanks 32 allows for easy adjustment to ensure a sealing engagement between mating components. After positioning first leg 24 as desired, mounting screws 30 are fully tightened to a final torque so that first leg 24 is secure. Thus, any dimensional disparities between mating parts are eliminated, and a leak proof seal is achieved. Assembly and adjustment of EGC valve 10 is relatively simple, and does not require complex parts and/or expensive precision machining.

It should be understood that EGC valve 10 may be mounted such that actuator shaft 18 and armature 16 are located adjacent either inlet port 12 or outlet port 14. This may reduce the need for precise sealing-depending on the requirements and particular use of EGC valve 10. In addition, exhaust flow F a plurality of inlet ports may be provided, which distribute exhaust flow F to any number of outlet ports. Alternatively, a plurality of inlet and outlet ports 12, 14 may be provided, wherein each inlet port 12 corresponds to a single outlet port. Thus, inlet ports and outlet ports may be any desired shape or number.

Figure 6:
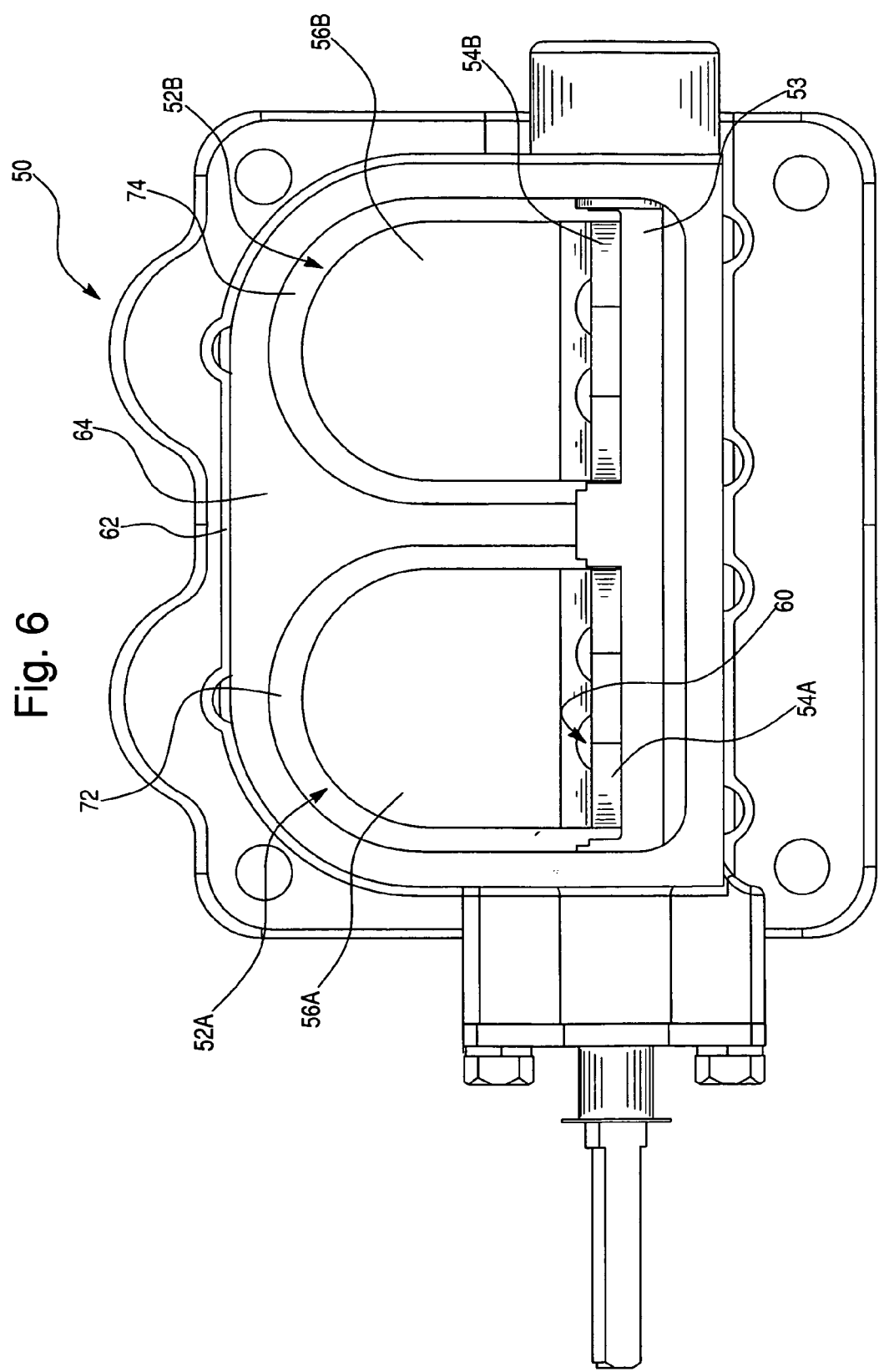
FIG. 6 is an elevational view of an exhaust gas control valve according to a second embodiment in a fully closed position.
Figure 7:
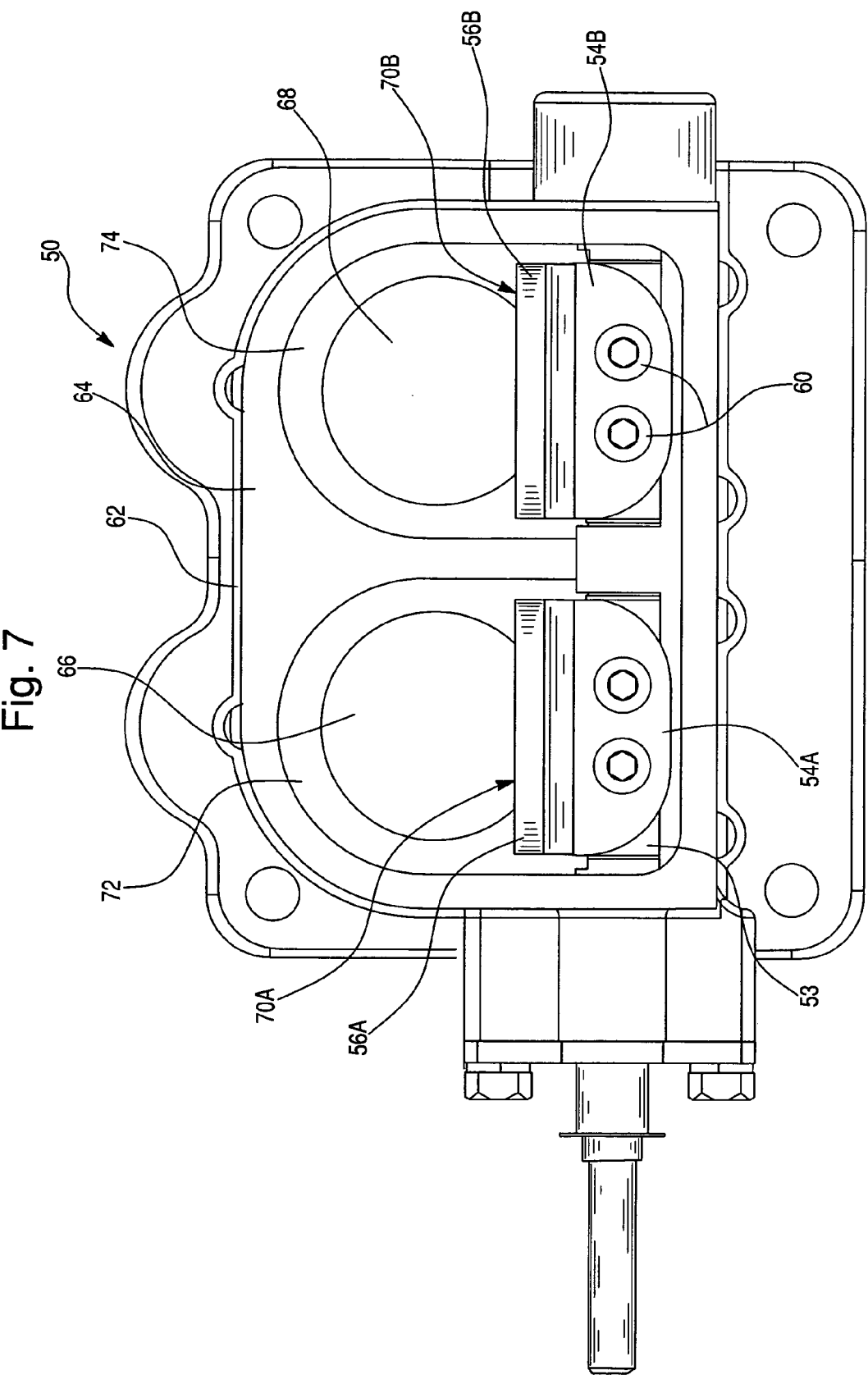
FIG. 7 is an elevational view of the exhaust gas control valve of FIG. 6 in a fully opened position.

In a second embodiment, EGC valve 50 comprises multiple valve armatures mounted on a common actuator shaft. As best shown in FIGS. 6 and 7, EGC valve 50 includes two armatures 52A, 52B mounted on actuator shaft 53. Each of armatures 52A, 52B is identical to armature 16 described above. Thus, each armature 52A, 52B includes first legs 54A, 54B and second legs 56A, 56B. First legs 54A, 54B are substantially perpendicular to second legs 56A, 56B, as described above for legs 24 and 26. First legs 54A, 54B include mounting holes (as shown in FIG. 1) and are fastened to actuator shaft 53 using mounting screws 60. Similar to EGC valve 10, the mounting holes on first legs 54A, 54B have diameters larger than the shanks of mounting screws 60 to allow for adjustment of armatures 52A, 52B prior to completely tightening screws 60 into actuator shaft 53 to their final torque.

Actuator shaft 53 and armatures 52A, 52B are positioned inside a valve housing 62 defining a flow channel 64 having a flow centerline. Actuator shaft 53 is offset from the flow centerline of flow channel 64. Exhaust flow F flows from an inlet port (not shown), through flow channel 64, and out outlet ports 66, 68, as best shown in FIG. 7. Exhaust flow F flows through channel 64 substantially unrestricted when armatures 52A, 52B are in the fully opened position. Armatures 52A, 52B are preferably mounted on actuator shaft 53 so that second legs 56A, 56B are coplanar. As such, armatures 52A, 52B are actuated and seal or open simultaneously by rotation of actuator shaft 53.

Sealing surfaces 70A, 70B are provided on armatures 52A, 52B, respectively, which sealing engage corresponding valve seats 72, 74 when in the fully closed position. Each armature 52A, 52B is independently adjustable to each sealing surface 70A, 70B, respectively, because of the difference between the diameters of the mounting holes versus the shanks of screws 60. This allows for adjustment of armatures 52A, 52B so that they may sealingly engage valve seats 72, 74. Thus, the effects of any disparities that may exist between mating parts are eliminated. Assembly is relatively simple, and manufacturing costs relatively low.

First legs 54A, 54B of armatures 52A, 52B are preferably aligned on actuator shaft 53 so that sealing and opening of outlet ports 66, 68 occurs simultaneously. Although outlet ports 66, 68 may be centered in flow channel 64, they may also be offset from the center of flow channel 64. In this way, the actuation input force required to operate armatures 52A, 52B may be controlled.

The present invention provides a single valve which achieves accurate flow control resolution, high flow capacity, reliable operation in an exhaust system environment, leak proof sealing when the valve is closed, and resistance to sticking. A failsafe operation mode is also provided and flow through multiple ports may be controlled with a single actuator. In addition, it is easy to manufacture and assemble. No complex sealing configurations, assembly procedures or precision machining are required. This is advantageous in keeping production costs low. The design lends itself to reliable operation due to the robust valve seal configuration and the minimized number of parts.

Although certain aspects of the present invention have been explained according to the preferred embodiments, it will be apparent to one of ordinary skill in the art that various modifications and variations can be made to the present invention without departing from the spirit of the invention. It is intended that the present invention cover all such modifications and variations, provided they come within the scope of the following claims and their equivalents.

What is claimed is:

1. A method of adjusting a valve armature on a valve seat, comprising the steps of:
   providing a single-piece L-shaped valve armature having a first leg and a second leg, the first leg having mounting holes and the second leg having a sealing surface;
   positioning the first leg on an actuator shaft so that the first leg is offset from a valve seat and the second leg is offset from an opening defined by the valve seat;
   positioning fasteners through the mounting holes and into the actuator shaft so that the first leg is transversely slideable relative to the actuator shaft;
   rotating the actuator shaft so that the second leg is parallel to the valve seat;
   sliding the first leg relative to the actuator shaft until the sealing surface engages the valve seat; and
   securing the fasteners so that the armature is secured to the actuator shaft.

2. The method of claim 1, including the step of providing as the fasteners screws having a head and a shank, the shank having a diameter less than a diameter of the mounting holes.

3. A method of controlling exhaust flow through a flow channel, comprising the steps of:
   providing a valve housing having an inlet port, an outlet port, a flow channel having a centerline extending between the ports, and a valve seat adjacent an opening in the outlet port;
   providing an actuator shaft offset from the centerline, the actuator shaft disposed in the flow channel between the at least one inlet port and the at least one outlet port, the actuator shaft having a single-piece L-shaped armature extending therefrom, the armature having a first leg and a second leg; and
   rotating the actuator shaft in a first direction for positioning the second leg substantially parallel to and offset from the centerline so that the flow channel is substantially unrestricted.

4. The method of claim 3, comprising the further step of rotating the actuator shaft in a second direction for positioning the second leg into sealing engagement with the valve seat to close the flow channel.

\* \* \* \* \*